United States Patent [19]

Homann et al.

[11] Patent Number: 5,738,385

[45] Date of Patent: Apr. 14, 1998

[54] DEVICE FOR JOINING THE END OF A HELICALLY CORRUGATED METAL TUBE TO ANOTHER BODY

[75] Inventors: Jorn Homann; Hartmut Krüger, both of Hanover, Germany

[73] Assignee: BRUGG Rohrsysteme GmbH, Germany

[21] Appl. No.: 746,933

[22] Filed: Nov. 18, 1996

[30] Foreign Application Priority Data

Nov. 25, 1995 [DE] Germany ................. 295 18 712.3

[51] Int. Cl.$^6$ .................................................. F16L 21/04
[52] U.S. Cl. .................. 285/226; 285/363; 285/368; 285/903; 285/906; 285/910
[58] Field of Search ....................... 285/226, 227, 285/228, 903, 363, 368, 906, 910

[56] References Cited

U.S. PATENT DOCUMENTS

| | | | |
|---|---|---|---|
| 289,967 | 8/1883 | Duffy | 285/226 |
| 3,844,587 | 10/1974 | Fuhrmann et al. | 285/903 X |
| 4,063,757 | 12/1977 | Fuhrmann | 285/903 X |

FOREIGN PATENT DOCUMENTS

| | | | |
|---|---|---|---|
| 2 641 842 | 7/1990 | France . | |
| 2402892 | 8/1974 | Germany | 285/903 |
| 33 02 450 | 7/1984 | Germany . | |
| 40 27 818 | 3/1992 | Germany . | |
| 589 249 | 6/1977 | Switzerland . | |
| 896309 | 1/1982 | U.S.S.R. | 285/903 |
| 627120 | 7/1949 | United Kingdom | 285/226 |

Primary Examiner—Dave W. Arola
Attorney, Agent, or Firm—Ware, Fressola, Van der Sluys & Adolphson LLP

[57] ABSTRACT

A device for joining the end of a helically corrugated metal tube to a connector or a second helically corrugated metal tube includes a back-up ring, pressure ring and a sealing ring. The connector is provided with a conical transition and an expanded diameter. The second helically corrugated tube is provided with a second back-up ring and pressure ring.

13 Claims, 2 Drawing Sheets

DEVICE FOR JOINING THE END OF A HELICALLY CORRUGATED METAL TUBE TO ANOTHER BODY

BACKGROUND OF THE INVENTION

1. Technical Field

The invention concerns a device for joining the end of a helically corrugated metal tube to a connector or another helically corrugated metal tube.

2. Description of the Prior Art

There are many ways to join metal tubes to each other, or to produce a connection between a metal tube and a connector. The named components are usually soldered or welded to each other, or they are screwed together.

The production of a connection of thin-walled metal tubes to each other or to a connector is problematic, since bolting or welding is difficult because of the thin wall thickness, and soldering can only be applied to a few metals. Even more complicated is the connection of a helically corrugated thin-walled metal tube to a connector.

It is known from CH-PS 589 249 to roll the end of a corrugated metal tube against the inner surface of a flange, which flattens the corrugation. The high pressure needed for the rolling produces a tight press-fit between the formerly corrugated metal tube and the metal flange. This type of connection requires expensive equipment at the installation site and presupposes thick-walled molded parts.

Another type of connection for corrugated metal tubes is described in DE-PA 33 02 450. A support bushing is screwed over the end of a corrugated tube, and a tube socket is screwed into the end of the corrugated tube. The seal is produced in that the open width of the support bushing increases toward the end, and/or the outside diameter of the tube socket decreases toward the end. When the tube socket is screwed into the end of the corrugated tube, which was adapted to the inner contour of the outside bushing by a molding tool, the corrugated tube is sealed between the tube socket and the support bushing.

A connection fitting for helically corrugated metal tubes is known from DE-OS 40 27 818, which contains an outer bushing that is screwed over the corrugated tube end and has a smooth tube extension which protrudes from the corrugated tube end. The smooth tube extension is threaded on the inside and a connection tube is screwed into it. A stepped end of the connection tube protrudes into the corrugated tube. When the connection tube is screwed in, it swages the corrugation at the end of the corrugated tube. The seal is obtained by placing a graphite packing cord into the last corrugation wave, which is distorted when the corrugation is swaged and is pressed against the inside wall of the outer bushing and the stepped end of the tube socket which protrudes into end of the corrugated tube.

SUMMARY OF THE INVENTION

It is an object of the present invention to provide a joint or a passage connection for helically corrugated metal tubes, which is constructed of simple components and can be installed without special tools. The use of welding or soldering tools in particular must be eliminated.

The essential advantage of the invention is that the seal is located in the force by-pass and external strains are mechanically alleviated after the installation. This leads to a lasting seal even under strong temperature fluctuations.

A particular additional advantage is that the arrangement of the invention can be used to join the internal tubes of a conduit pipe containing two coaxial corrugated tubes. Such a conduit pipe has a layer of plastic foam insulation between the corrugated tubes and is preferred for use as a remote heat conduction pipe.

The invention will be fully understood when reference is made to the following detailed description taken in conjunction with the accompanying drawings.

DETAILED DESCRIPTION OF THE INVENTION

Figure 1:
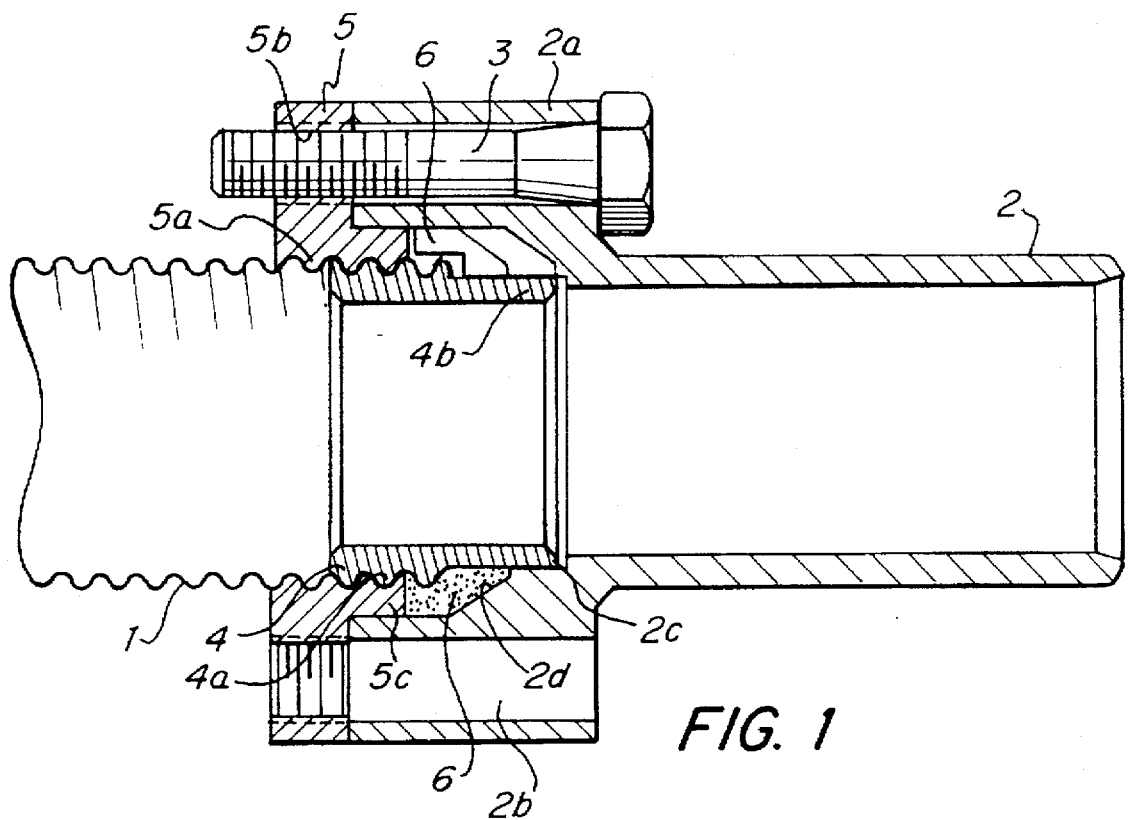
FIG. 1 is a cross-sectional view of a device made in accordance with the present invention providing a connector on the end of a helically corrugated metal tube and showing different types of sealing rings in the upper and lower portions thereof.

FIG. 1 illustrates a joint between a helically corrugated metal tube 1 and a connector 2 which is preferably made of metal. The user can solder, weld or screw smooth tube ends, tube flanges etc. to the end of the connector 2 in the usual manner. The connector 2 has a flange portion 2a with holes 2b through which threaded bolts 3 can be inserted.

A back-up ring 4 with a coarse thread 4a is screwed into the end of the corrugated metal tube 1. The back-up ring 4 has a smooth-walled area 4b which protrudes from the end of the metal tube 1. A pressure ring 5 with a coarse thread 5a is screwed far enough over the end of the metal tube 1, so that the end of the metal tube 1 protrudes by at least one corrugation wave from the pressure ring 5. The pressure ring 5 also has holes 5b, which are preferably threaded holes so that the threaded bolts 3 can be screwed into them.

The pressure ring 5 has an extension 5c which penetrates into the flange 2a of the connector 2. The extension 5c can also be conical at the front end. A bore 2c for receiving the end of the smooth-walled area 4b is provided in the transition area of connector 2, from the tube-shaped area to the flange 2a. A conical transition area 2d adjoins the bore 2c.

The sealed chamber formed by the smooth-walled area 4b, the end of the metal tube 1, the extension 5c, the flange 2a and the conical transition 3d contains a sealing ring 6 made of a compressible material. The sealing ring 6 shown in the upper portion of FIG. 1 can be advantageously designed in two parts of different densities, where the density of the narrow shaft part, i.e. the part which lies on the end of the corrugated tube 1 before the compression, is lower than the density of the shaft part which lies on the smooth wall area 4b. This produces two significant advantages:

1) The narrow shaft part is easier to manufacture due to the lower density of about 1.25 to 1.4 g/cm$^3$.

2) This part is particularly easy to deform during the compression, thus leading to a more secure seal.

Alternatively, there is a special advantage if graphite is used as the sealing ring 6 as shown in the lower portion of FIG. 1. The graphite is compressed by tightening the threaded bolts 3 and by the consequent decrease in the sealed chamber volume, and flows into the gap between the individual components. In its initial installed condition, the graphite has a density of 1.25 to 1.6 g/cm³ while, in the compressed condition, its density is in a range 10 to 20% higher.

Figure 2:
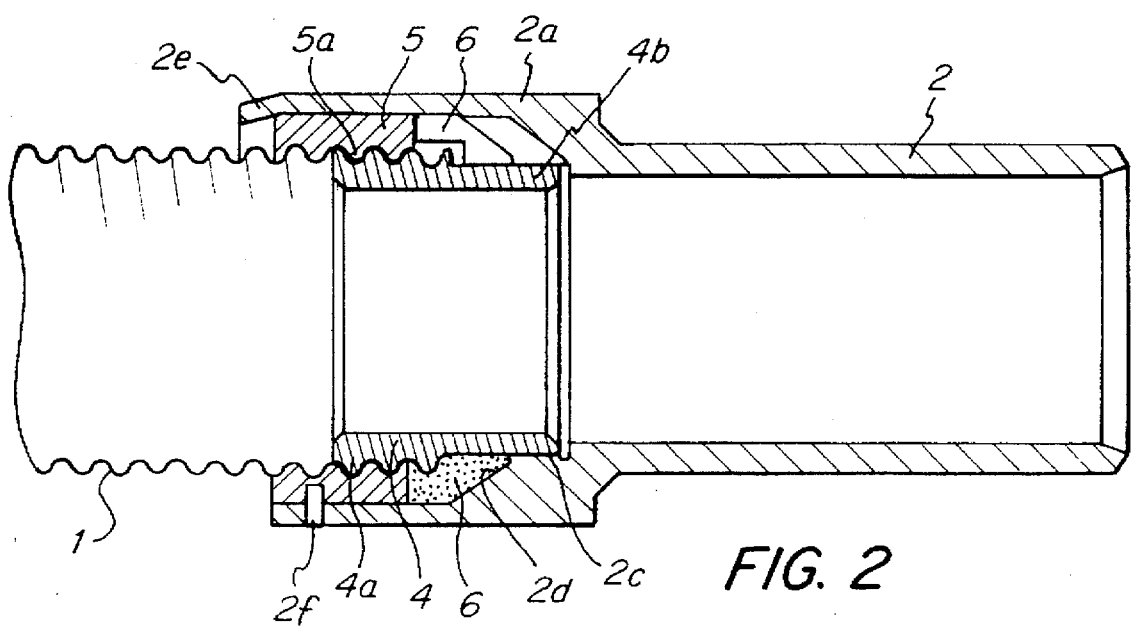
FIG. 2 is a cross-sectional view of a second embodiment of a device providing a connector on the end of a helically corrugated metal tube and showing different types of sealing rings in the upper and lower portions thereof.

The upper portion of FIG. 2 depicts the axial pressure and compression of the sealing ring 6 by means of a not illustrated special tool, instead of the threaded bolts 3. The sealing ring 6 is made of a compressible material as described above with respect to FIG. 1. The compressed condition is kept in place by the connector 2 extending beyond the pressure ring 5 at the end facing the corrugated tube 1, and the extending end 2e being shaped downward.

Another solution shown in the lower portion of FIG. 2 provides one or more pins 2f to hold the sealing ring 5 and the connector 2 in place. The lower portion of FIG. 2 also shows a sealing ring 6 made of graphite.

Figure 3:
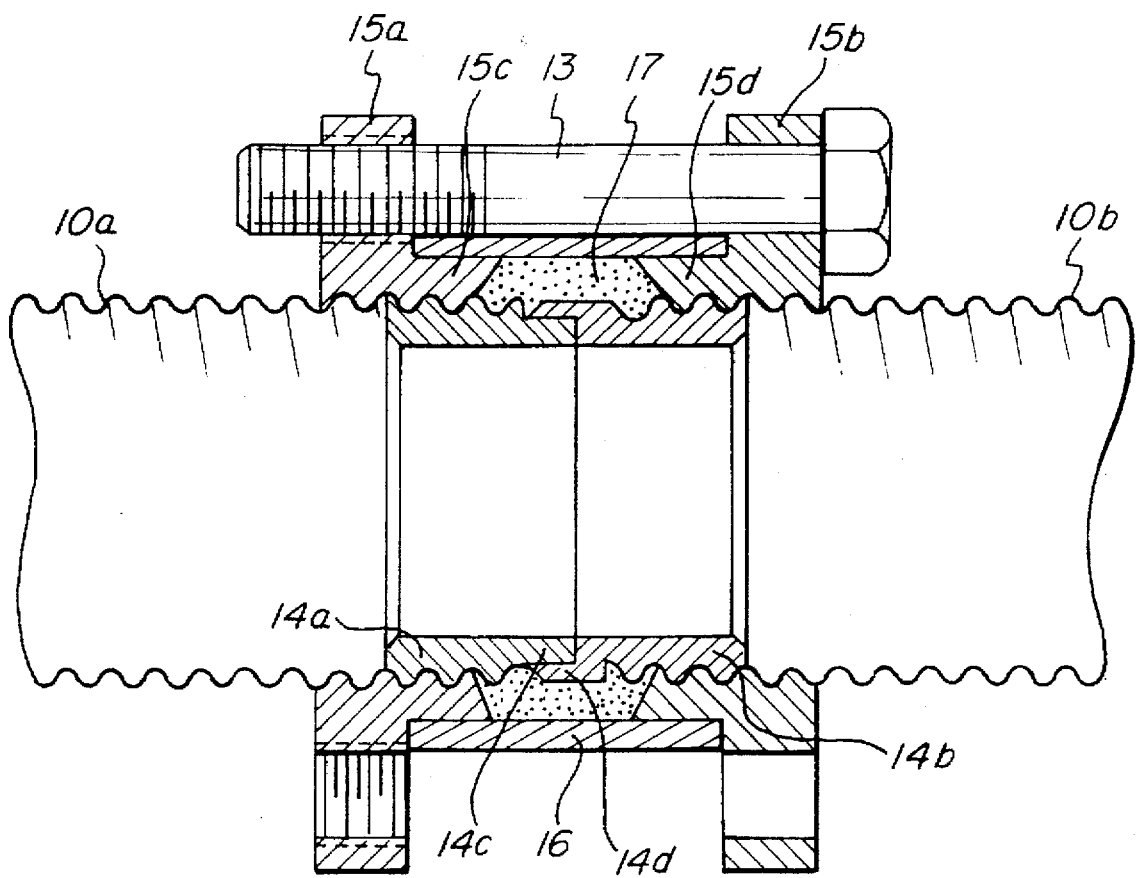
FIG. 3 is a cross-sectional view of a device made in accordance with the present invention connecting the ends of two helically corrugated metal tubes.

FIG. 3 illustrates a passage connection for two helically corrugated metal tubes 10a and 10b. A back-up ring 14a and 14b is screwed into each tube 10a and 10b. The smooth-walled extensions 14c and 14d of back-up rings 14a and 14b have different diameters, so that they can be inserted into each other. Pressure rings 15a and 15b are screwed on the corrugated tubes 10a and 10b, which are pulled together by means of threaded bolts 13. A bushing 16 is placed on extensions 15c and 15d, to close off the sealed chamber against the outside. A sealing ring 17 is located in the sealed chamber and can be made of graphite.

The preferred embodiments described above admirably achieve the objects of the invention. However, it will be appreciated that departures can be made by those skilled in the art without departing from the spirit and scope of the invention which is limited only the following claims.

What is claimed is:

1. An arrangement for connecting an end of a helically corrugated metal tube to another body, which comprises:

a) a back-up ring with an external thread, which extends over part of its outer surface area and is screwed into the end of the helically corrugated metal tube;

b) a pressure ring with an internal thread screwed far enough over the end of the helically corrugated metal tube so that the end of the helically corrugated metal tube protrudes from the pressure ring;

c) means connecting the another body to the pressure ring;

d) a sealing ring made of graphite and located between the back-up ring, the pressure ring and the connect means; and e) means for compressing the sealing ring by axially pulling of the pressure ring and said connect means toward each other.

2. An arrangement as claimed in claim 1, wherein, in its installed condition the graphite has a density of 1.25 to 1.6 g/cm³, and in the compressed condition its density is in a range 10 to 20% higher.

3. An arrangement as claimed in claim 1, wherein the back-up ring has a smooth-walled area which protrudes from the end of the corrugated metal tube when the back-up ring is screwed therein.

4. An arrangement as claimed in claim 3, wherein said connect means, together with the pressure ring and the smooth-walled area of the back-up ring forms a chamber for the sealing ring.

5. An arrangement as claimed in claim 3, wherein the sealing ring has steps formed on its inside diameter, where the first step rests on the smooth-walled area of the back-up ring and the second step rests on the end of the helically corrugated metal tube.

6. An arrangement as claimed in claim 5, wherein the second step has a lower density than the first step.

7. An arrangement as claimed in claim 1, wherein the another body is a connector and said connect means includes a conical transition and an expanded diameter on the connector.

8. An arrangement as claimed in claim 1, wherein the pressure ring has a flange with several openings, said connect means also has a flange with several openings, and that the axial pulling is achieved with threaded bolts located in the respective openings of the two flanges.

9. An arrangement as claimed in claim 8, wherein each of the openings in the flange of pressure ring has an internal thread.

10. An arrangement as claimed in claim 1, wherein the sealing ring has two parts, each of a different density.

11. An arrangement as claimed in claim 1, wherein the another body is another helically corrugated metal tube.

12. An arrangement as claimed in claim 11, wherein said connect means comprises:

a) a second back-up ring with an external thread which extends over part of its external surface and is screwed into the end of the another helically corrugated metal tube; and b) a second pressure ring with an internal thread screwed far enough over the end of the second helically corrugated metal tube so that the end of the second helically corrugated metal tube protrudes from the second pressure ring.

13. An arrangement as claimed in claim 11, wherein the pressure ring has a flange with several openings, said connect means also has a flange with several openings, and that the axial pulling is achieved with threaded bolts located in the respective openings of the two flanges.

* * * * *